UNITED STATES PATENT OFFICE.

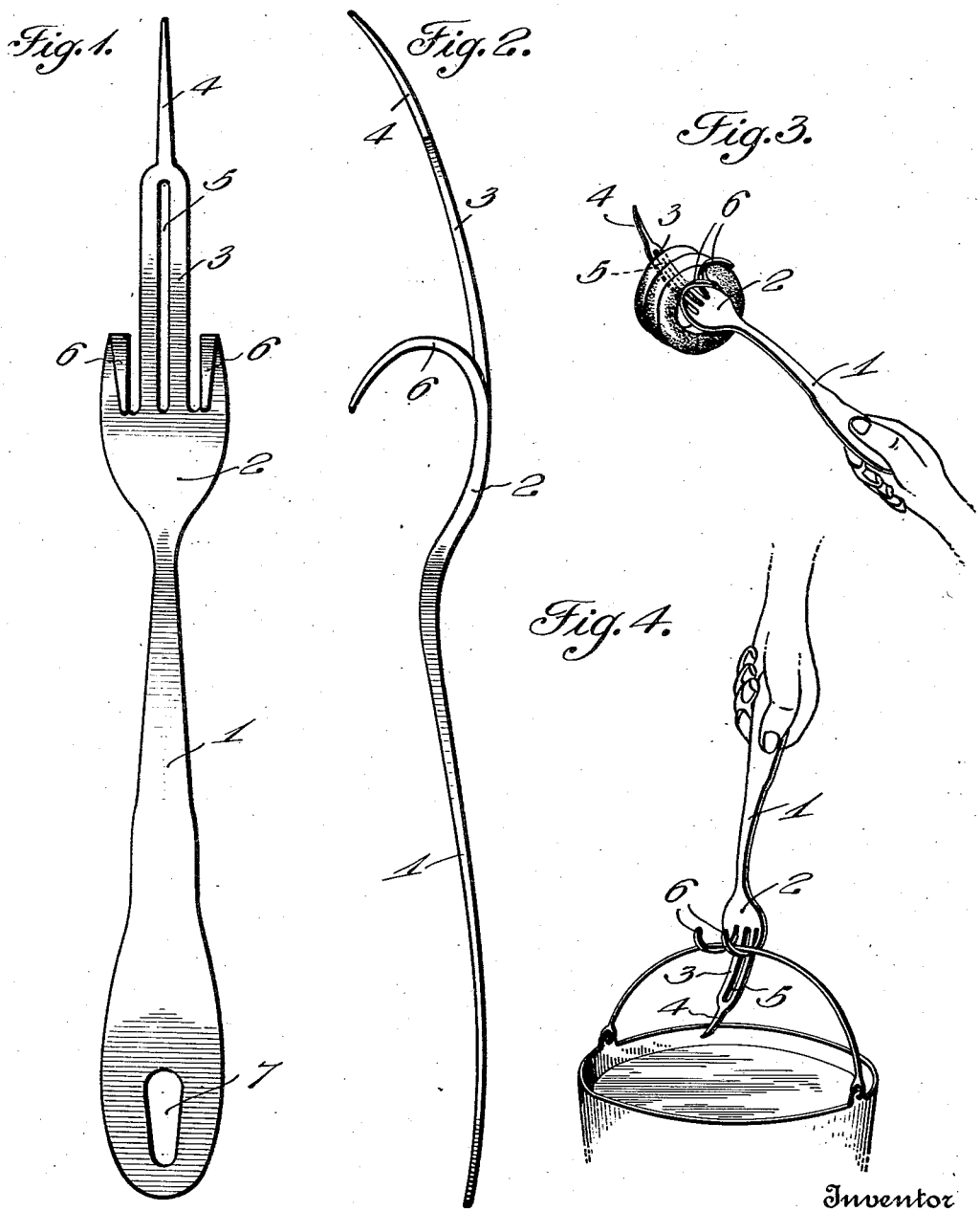

LILLIAN C. RAYMOND, OF DETROIT, MICHIGAN.

KITCHEN-FORK.

1,313,417.  Specification of Letters Patent.  Patented Aug. 19, 1919.

Application filed January 16, 1919. Serial No. 271,414.

*To all whom it may concern:*

Be it known that I, LILLIAN C. RAYMOND, a citizen of the United States, residing at Detroit, in the county of Wayne and State of Michigan, have invented certain new and useful Improvements in Kitchen-Forks; and I do declare the following to be a full, clear, and exact description of the invention, such as will enable others skilled in the art to which it appertains to make and use the same.

My invention has for its object to provide a simple and inexpensive fork which will be of great advantage in making fried cakes, doughnuts or the like, and not only for removing them from the hot grease, but for carrying the hot kettle from the stove to a table and vice versa.

With the foregoing object in view, the invention resides in the novel construction of the fork hereinafter fully described and claimed and illustrated in the accompanying drawing.

Figure 1 is a face view of the fork.

Fig. 2 is an edge view.

Fig. 3 is a perspective view showing the manner in which the fork may be used for removing fried cakes or doughnuts from hot grease.

Fig. 4 is a perspective view illustrating the manner in which the fork may be used for carrying the kettle of grease from the stove to the table and vice versa.

The entire device is preferably stamped from one piece of suitable gage sheet metal and may thus be easily and inexpensively manufactured, and furthermore will be less liable to get out of order than if a multiple part construction were employed. The numeral 1 designates the handle of the fork having the usual widened portion at its front end. A relatively wide and long central tine 3 extends forwardly from the handle 1 and is curved longitudinally to a slight extent, the front end of said tine being reduced in width to form an extended prong 4, while the remaining length of the tine is formed by the central longitudinal slot 5.

A pair of relatively short and narrow side tines 6 are disposed one on each side of the central tine 3, adjacent the rear end of the latter, said side tines being curved in the same direction as the tine 3 and being additionally curved rearwardly to provide a pair of hooks.

The rear end of the handle 1 may be provided with an opening 7 or other preferred means for hanging the fork when not in use.

For removing fried cakes or other doughnuts having openings therethrough, from the hot grease, the central tine 3 is inserted through such openings of a suitable number of cakes, and when the front end of the fork is tilted upwardly to retain the cakes on said tine, the side tines 6 will prevent them from sliding rearwardly upon the fork handle and burning the hand of the user. The slot 5 permits the grease to drain off more rapidly than would be possible if the central tine were imperforate. When removing puff ball doughnuts and the like from the grease, the prong 4 is employed and the doughnut is not injured in any manner. This short point will also be found of advantage for many other purposes, such as removing milk bottle tops, taking corks from extract bottles, etc.

In addition to the function of the side tines 6, already described, they are advantageous for numerous other purposes, such as carrying the hot kettle of grease from the fire to the table and vice versa, for withdrawing hot pans and the like from ovens, etc.

The device is not large or cumbersome, may be handled with ease and is an exceptionally handy kitchen article. Since probably the best results are obtained from the exact construction disclosed, it may well be followed, but within the scope of the invention as claimed, numerous minor changes might well be made without imparting from or sacrificing any advantages of the invention as claimed.

I claim:

A kitchen fork whose handle is provided with a relatively long and wide central tine curved longitudinally to a slight extent and reduced in width at its front end to provide an extended prong, the greater part of the length of said tine having a longitudinal slot, and a pair of comparatively short and narrow side tines disposed one on each side of said central tine, said side tines being curved in the same direction as said central tine and being additionally curved rearwardly.

In testimony whereof I have hereunto set my hand.

LILLIAN C. RAYMOND.